April 20, 1943.   H. F. PARKER ET AL   2,317,215
HOOK BLOCK
Filed March 17, 1942

INVENTORS
HUMPHREY F. PARKER
AND ERFORD E. ROBINS
BY
Beau, Brooks, Buckley & Beau
ATTORNEYS

UNITED STATES PATENT OFFICE 2,317,215

HOOK BLOCK

Humphrey F. Parker, Kenmore, and Erford E. Robins, Tonawanda, N. Y., assignors to Columbus McKinnon Chain Corp., Tonawanda, N. Y., a corporation of New York Application March 17, 1942, Serial No. 435,066

11 Claims. (Cl. 254—193)

Our invention relates in general to hook blocks and more particularly to a hook block for use in connection with wire rope hoists designed for four-part rope reeving.

The general object of our invention has been to provide a hook block having a multi-part casing, the casing parts being separable to expose the grooves of both sheaves of the block to permit easy installation or replacement of the cable.

Moreover, our invention is of such a nature that the cover parts of the casing may be removed without disturbing the block mechanism or the cable.

Furthermore, the cover parts of our casing are piloted upon the shaft ends, and the joints between these casing parts and the central casing part are so formed that the entire casing is centralized and held substantially concentrically with respect to the sheaves of the block.

Moreover, the casing parts of our device are assembled and held together by means of two fastening screws so located that the block has a smooth exterior surface.

The above objects and advantages have been accomplished by the device shown in the accompanying drawing, of which:

Figure 1:
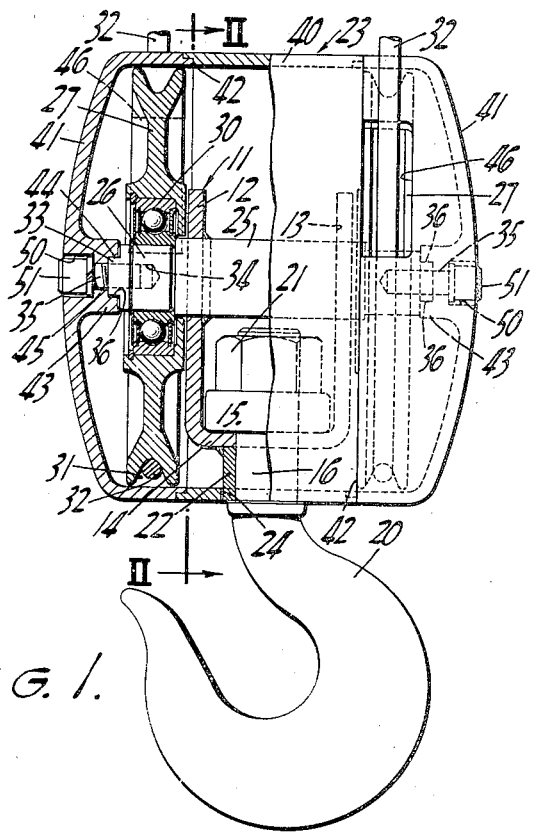
Fig. 1 is a fragmentary, side elevation of our complete hook block.
Figure 2:
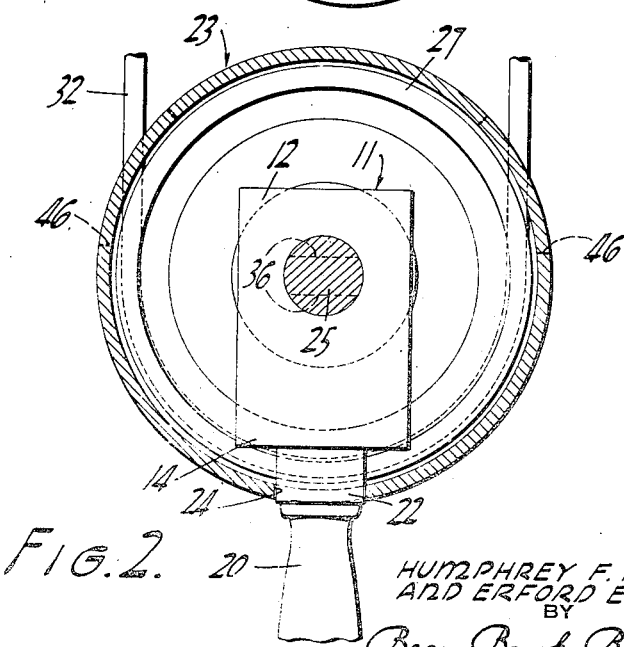
Fig. 2 is a fragmentary, sectional elevation taken on line II—II of Fig. 1.

Our device comprises a hook yoke 11 having two upstanding arms 12 and 13 connected together by a cross member 14. The cross member 14 is of sufficient length to space the upstanding arms 12 and 13 so as to provide for the accommodation of the hook bearing 15. This bearing is preferably of the anti-friction type and supports the stud 16 of the hook 20 by means of the usual nut 21 screwthreaded to the upper end thereof.

A hook sleeve 22 surrounds the stud 16 and extends downwardly from the cross member 14 to the exterior of the casing 23 through an aperture 24 formed therethrough. The sleeve 22 may be welded to the yoke.

The shaft 25 of our device is passed through suitable apertures formed in the upstanding arms of the yoke where it is secured by welding against end movement. The ends of the shaft extend beyond the arms where each is provided with a portion 26 which may be somewhat reduced in diameter, each end being formed with a screwthreaded aperture 34 for the reception of fastening screws 35. An anti-friction bearing 30 is disposed upon each of the portions 26 and each carries one of the sheaves 27 of our device. Each of these sheaves is provided with the usual groove 31 for the reception of the hoist cable 32.

The casing 23 comprises a central part 40 and cover parts 41 arranged one at each side of the central part. These parts are joined together preferably by means of rabbet joints 42 whereby, when assembled, the casing parts will be brought into axial alignment with each other. Each of the cover parts of the casing is provided with a centrally arranged hub 43 which is formed on its inner face with a lateral groove 44 for the reception of a projection 33 formed on each end of the shaft. Each of the projections is formed with flattened surfaces 36 for non-rotative engagement with the groove 44, whereby the cover parts 41 will be held upon the shaft against rotation. An aperture 45 is provided in each cover part for the passage of the screw 35, a counterbore 50 being also provided for the reception of the head 51 of the screw, whereby these screws are made flush with the exterior of the casing. The screws 35 and the flattened surfaces 36 on the shaft projections 33 serve to centralize the cover parts 41 with the shaft.

As clearly shown in Fig. 1, the rabbet joints 42 between the central casing part 40 and the cover parts 41 are located just inside of the inner faces of the sheaves 26, so that when the cover parts are removed the entire periphery of each of the sheaves will be exposed and thus permit the easy installation of the cable, whereby the necessity of having to thread it through any openings is avoided. Each of the cover parts 41 is provided with an opening 46 for the passage of the cable 32 as it extends through the casing. These openings 46 extend to the edge of the cover parts and therefore permit the covers to be removed from the device without disturbing the cable. When the casing parts are assembled, the openings 46 are closed by the adjacent edge of the central casing part 40. The flattened surfaces 36 on the shaft ends and the registering lateral grooves 44 are so positioned that the openings 46 will register with the cable passes when the device has been assembled, thus obviating any undesirable results attending careless assembling and assuring against accidental rotation of the cover parts to positions where the cable will ride against the edges of the openings.

From the foregoing it will be obvious that after the central casing part 40 has been placed about the yoke and the sleeve 22 engaged with the opening 24, the hook 20 is connected to the yoke. The cable passes may now be engaged with the sheave grooves and to complete the assembly it is only necessary to engage the end covers 41 with the shaft projections. As the grooves of the cover parts are being brought into registration with the shaft projections 33, the central casing part 40 is moved to the position where its joints will register with the complementary joints of the covers. After the parts are thus assembled the screws 35 are placed in the apertures 45 and the entire casing drawn together.

From the foregoing it will be obvious that by the removal of but two screws, the casing may be disassembled and the cover parts removed so as to expose the peripheries of the sheaves, whereby the installation or replacement of the cable may be easily and quickly accomplished. When installing the cable, it is obvious that it does not have to be threaded through any restricted openings or passageways. It is, furthermore, obvious that when the cover parts are put in place and the casing is completely assembled, all working parts of the hook block are enclosed. Furthermore, the cover parts are close fitting and the openings 46 are of such size as to prevent the cable from becoming displaced from the grooves 31 of the sheaves.

Obviously, some modifications of the details herein shown and described may be made without departing from the spirit of our invention or the scope of the appended claims, and we do not, therefore, wish to be limited to the exact embodiment herein shown and described, the form shown being merely a preferred embodiment thereof.

What we claim is:

1. A hook block for cable hoists, comprising a yoke, a shaft carried by the yoke, a hook suspended from said yoke, the ends of said shaft extending beyond said yoke and carrying sheaves thereon, a three-part casing, said casing including a central part so proportioned as to lie substantially wholly within the space between the sheaves, and means for securing the casing parts together and to the shaft, whereby the sheaves may be readily accessible for the installation of the cable.

2. A hook block for cable hoists, comprising a yoke, a shaft carried by the yoke, a hook suspended from said yoke, the ends of said shaft extending beyond said yoke and carrying sheaves thereon, a three-part casing concentrically arranged with respect to said shaft, said casing including a central part so proportioned as to lie substantially wholly within the space between the sheaves, and means for securing the casing parts together and to the shaft, whereby the sheaves may be readily accessible for the installation of the cable.

3. A hook block for cable hoists, comprising a yoke, a shaft carried by the yoke and fixed axially therein, a hook suspended from said yoke, the ends of said shaft extending beyond said yoke and carrying sheaves thereon, a three-part casing, said casing including a central part so proportioned as to lie substantially wholly within the space between the sheaves, and means for securing the casing parts together and to the shaft, whereby the sheaves may be readily accessible for the installation of the cable.

4. A hook block for cable hoists, comprising a yoke, a shaft carried by the yoke, a hook suspended from said yoke, the ends of said shaft extending beyond said yoke and carrying sheaves thereon, a three-part casing, comprising a central part and two cover parts, said cover parts being supported wholly by said shaft and said central part being supported wholly by said cover parts, and means for securing said parts together.

5. A hook block for cable hoists, comprising a yoke, a shaft carried by the yoke, a hook suspended from said yoke, the ends of said shaft extending beyond said yoke and carrying sheaves thereon, a three-part casing, comprising a central part and two cover parts, said central part being so proportioned as to lie substantially wholly within the space between the sheaves, said cover parts being supported wholly by said shaft and said central part being supported wholly by said cover parts, and means for securing said parts together.

6. A hook block for cable hoists, comprising a yoke, a shaft carried by the yoke, a hook suspended from said yoke, the ends of said shaft extending beyond said yoke and carrying sheaves thereon, a three-part casing concentrically arranged with respect to said shaft, comprising a central part and two cover parts, said cover parts being supported wholly by said shaft and said central part being supported wholly by said cover parts, and means for securing said parts together.

7. A hook block for cable hoists, comprising a yoke, a shaft carried by the yoke, a hook suspended from said yoke, the ends of said shaft extending beyond said yoke and carrying sheaves thereon, a three-part casing, comprising a central part and two cover parts, said cover parts being each provided with a hub recessed to engage the shaft ends, means for securing said covers to said shaft, and means for holding said central part in registration with said covers.

8. A hook block for cable hoists, comprising a yoke, a shaft carried by the yoke, a hook suspended from said yoke, the ends of said shaft extending beyond said yoke and carrying sheaves thereon, a three-part casing, comprising a central part and two cover parts, said cover parts being supported wholly by said shaft and said central part being supported wholly by said cover parts, said central part being formed with an aperture for the hook, and means for securing said parts together.

9. A hook block for cable hoists, comprising a yoke, a shaft carried by the yoke, a hook suspended from said yoke, the ends of said shaft extending beyond said yoke and carrying sheaves thereon, a projection at each end of the shaft formed with oppositely arranged flattened surfaces, a three part casing, comprising a central part and two cover parts, means carried by said casing parts for keeping them in axial alignment, each of said cover parts being provided with a hub having a centrally arranged lateral slot in its face for non-rotative engagement with one of said projections, and clamping means engaging said shaft ends and said cover parts for centralizing said cover parts and securing them to said shaft.

10. A hook block for cable hoists, comprising a yoke, a shaft carried by the yoke, a hook suspended from said yoke, the ends of said shaft extending beyond said yoke and carrying sheaves thereon, a three-part casing, comprising a central part and two cover parts, said cover parts being supported wholly by said shaft and said central part being supported wholly by said cover parts, a sleeve carried by said yoke and surrounding the stud of said hook, said sleeve engaging an aperture formed in said central part, and means carried by said shaft and said cover parts for securing said casing in place.

11. A hook block for cable hoists, comprising a yoke, a shaft carried by the yoke, a hook suspended from said yoke, the ends of said shaft extending beyond said yoke and carrying sheaves thereon, a projection at each end of the shaft formed with oppositely arranged flattened surfaces, a three part casing, comprising a central part and two cover parts, means carried by said casing parts for keeping them in axial alignment, each of said cover parts being provided with a hub having a centrally arranged lateral slot in its face for non-rotative engagement with one of said projections, a sleeve carried by said yoke and surrounding the stud of said hood, said sleeve engaging an aperture formed in said central part, and clamping means engaging said shaft ends and said cover parts for centralizing said cover parts and securing them to said shaft.

HUMPHREY F. PARKER.
ERFORD E. ROBINS.